(12) United States Patent
Weber et al.

(10) Patent No.: US 9,151,377 B2
(45) Date of Patent: Oct. 6, 2015

(54) AXLE PORTING TO LEGS (75) Inventors: Jason Weber, Peoria, IL (US); John B. Salomon, Peoria, IL (US); Benjamin T. Nelson, Peoria, IL (US); Stephen R. Dockstader, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 405 days.

(21) Appl. No.: 13/549,658

(22) Filed: Jul. 16, 2012

(65) Prior Publication Data

US 2014/0013886 A1 Jan. 16, 2014

(51) Int. Cl.
F16H 57/04 (2010.01)
F16H 57/02 (2012.01)
F16H 57/037 (2012.01)

(52) U.S. Cl.
CPC ........ *F16H 57/0409* (2013.01); *F16H 57/0423* (2013.01); *F16H 57/0447* (2013.01); *F16H 57/0483* (2013.01); *F16H 57/037* (2013.01); *F16H 57/0415* (2013.01); *F16H 57/0471* (2013.01); *F16H 2057/02052* (2013.01); *Y10T 29/49464* (2015.01); *Y10T 74/19665* (2015.01)

(58) Field of Classification Search
CPC ............ F16H 57/0409; F16H 57/0423; F16H 57/0447; F16H 57/0483
USPC ............. 301/124.1, 132, 137; 184/6.12, 11.1, 184/11.2; 74/606 R, 607, 417; 475/160, 475/230; 29/897.2
See application file for complete search history.

(56) References Cited

U.S. PATENT DOCUMENTS

| 3,383,937 | A | | 5/1968 | Toenne et al. |
| 3,825,099 | A | | 7/1974 | Hopf |
| 5,316,106 | A | * | 5/1994 | Baedke et al. ............... 184/6.12 |
| 5,839,327 | A | * | 11/1998 | Gage ............................. 74/607 |
| 6,502,665 | B1 | * | 1/2003 | Brehob ....................... 184/6.12 |
| 6,997,284 | B1 | * | 2/2006 | Nahrwold ................... 184/6.12 |
| 7,374,507 | B2 | * | 5/2008 | Corless et al. ................ 475/159 |
| 8,109,174 | B2 | * | 2/2012 | Hilker et al. ................ 74/606 A |
| 8,267,827 | B2 | * | 9/2012 | Durbin et al. ................ 475/159 |
| 2010/0038174 | A1 | | 2/2010 | Mordukhovich et al. |
| 2010/0144480 | A1 | * | 6/2010 | Downs et al. ................. 475/160 |

FOREIGN PATENT DOCUMENTS

DE 4023354 C2 * 4/1994

* cited by examiner

*Primary Examiner* — Kip T Kotter
(74) *Attorney, Agent, or Firm* — Miller, Matthias & Hull LLP (57) ABSTRACT

An axle assembly and method for assembling such axle assembly for a vehicle are disclosed. The axle assembly may comprise meshed ring and pinion gears, a center housing portion, and left and right leg housing portions. The center housing portion may include a center housing defining a center cavity in which the bevel gear is disposed, and at least one channel having an entrance port into the center cavity. The axle assembly may include a first conduit configured to branch off of the first channel in a first direction and a second conduit configured to branch off of the first channel in a second direction. Such channels and conduits may be integral to the center housing or substantially external to the center housing.

14 Claims, 13 Drawing Sheets

AXLE PORTING TO LEGS

TECHNICAL FIELD

The present disclosure generally relates to axle housings of vehicles and, more particularly, relates to axle housings configured to cover bevel and pinion gear sets used in earth moving, construction, material handling, mining applications, and the like.

BACKGROUND

The axle housings of vehicles used for earth moving, construction, material handling, mining, and the like, are partially filled with oil or other lubricating fluid (collectively, "oil") to ease contact between meshing gears contained in the housing. It is desirable to have a film of oil between meshing gear teeth in order to avoid the extreme heat that may otherwise be created in the contact area of the teeth. Such extreme heat causes, between the surfaces of the meshing gear teeth, micro-welding that results in tearing and pitting of the gear teeth and breaking of the teeth due to material fatigue.

Each axle housing typically contains a toothed gear set such as a bevel gear and a pinion gear. The teeth of the smaller dimensioned pinion gear mesh with the teeth of the bevel gear. Generally, an output shaft from the vehicle transmission provides power to rotate the pinion gear. The rotating and meshing of the pinion gear teeth with the bevel gear teeth drives the bevel gear and transfers power, through the rotating bevel gear, to the wheels of the vehicle. The gear ratio of the pinion gear to the bevel gear typically creates a reduction of the input speed from the transmission and an increase in the torque applied to the wheels.

Generally, the axle housing is filled with enough oil to ensure that gear teeth, including those of the bevel and pinion gears, are lubricated. Thus, a larger gear disposed generally vertically within the axle housing (such as the bevel gear), which requires a lower fill level of oil in the axle housing, has to rotate through a much deeper oil fill level in order to ensure that other gears (for example, those with smaller diameters, those positioned horizontally) are adequately lubricated. Thus, the oil flow around a large gear, such as the bevel gear, is often turbulent due to the depth of oil in which the gear must rotate. This turbulence may be compounded by the meshing of gears, such as the bevel and pinion gears, that have different rotational axes. The input power required to overcome the resistance of the oil to the rotation of the gear(s) may be referred to as "churning loss." This churning loss results in increased fuel usage as more input power must be applied to make-up for the churning loss.

In addition, the axle housing is filled with enough oil to lubricate componentry disposed in either end of the axle housing (in the legs of axle housing). When the vehicle is operating on an incline, and hence the axle housing is inclined, the oil in the axle housing flows downhill toward the axle housing leg that is lowest on the incline. This flow increases the churning of the oil and decreases the availability of oil for lubrication of the componentry disposed in the leg housing that is higher on the incline. Neither is a beneficial result.

Figure 1:
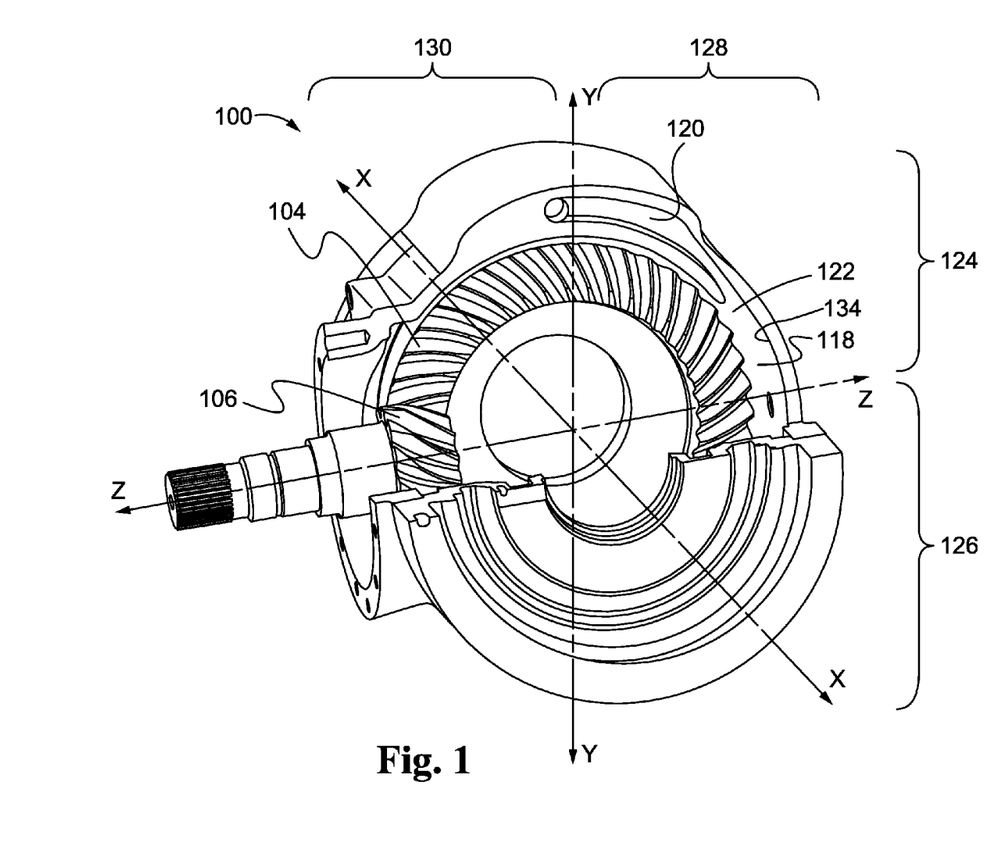
FIG. 1 is a cut-away view of one embodiment of a center housing portion constructed in accordance with the teachings of this disclosure.

U.S. Pat. No. 3,825,099 ("Hopf") issued Jul. 23, 1974 is an example of prior art related to oil associated with bevel gears in axle drives. FIG. 1 of Hopf discloses a lubrication arrangement in which oil thrown up by the bevel gear is caught by a trough and conducted into collection chambers/pockets. The oil is then gravity fed through a maze of chambers into the differential gear housing that is adjacent to the bevel gear in the center portion of the housing. Disadvantageously, Hopf deposits the oil flowing out of the differential gear housing back into the center portion of the housing in the proximity of the bevel gear. A better design is needed that removes oil from the center housing portion of an axle housing, decreases churning loss and provides a flow of oil to the upper end of the axle housing when the axle housing is inclined.

SUMMARY OF THE DISCLOSURE

In accordance with one aspect of the disclosure, an axle assembly is disclosed. The axle assembly comprises a bevel gear rotatable about a bevel gear axis, a pinion gear meshed with the bevel gear, and a center housing. The center housing may define a center cavity in which the bevel gear is disposed and may include an integral first channel, an integral tube-like first conduit and an integral tube-like second conduit. The first channel may have a first entrance port into the center cavity. The first channel may be disposed proximal to the bevel gear. The first conduit may be configured to branch off of the first channel in a first direction, and the second conduit may be configured to branch off of the first channel in a second direction.

In accordance with another aspect of the disclosure, an axle assembly is disclosed for a vehicle. The axle assembly may comprise a bevel gear rotatable about a bevel gear axis, a pinion gear meshed with the bevel gear, a right leg housing portion including a right leg housing defining a right leg cavity, a left leg housing portion including a left leg housing defining a left leg cavity, a center housing portion, a first conduit and a second conduit. The center housing portion may be disposed between the right and left leg housing portions. The center housing portion may include a center housing defining a center cavity in which the bevel gear is disposed, and a first channel having a first entrance port to the center cavity. The first conduit may extend from the first channel to the right leg cavity. The second conduit may extend from the first channel to the left leg cavity. The first and second conduits may be substantially external to the axle housing. The first channel may be substantially integral to the center housing or may be substantially external to the center housing.

In accordance with a further aspect of the disclosure, a method of assembling a churning reduction assembly for a vehicle is disclosed. The method may comprise providing a bevel gear, a pinion gear and an axle housing. The bevel gear may be rotatable about a bevel gear axis. The axle housing may include a right leg housing that defines a right leg cavity, a left leg housing that defines a left leg cavity, a center housing portion, a first tube-like conduit and a second tube-like conduit. The center housing portion may be disposed between the right and left leg housings and may include a center housing defining a center cavity in which the bevel gear is disposed, a first channel, and a first port disposed in an upper half of the center housing. The first conduit may extend between the first channel and the right leg cavity. The second conduit may extend between the first channel and the left leg cavity. The method may further comprise positioning the bevel gear and the pinion gear inside the center housing portion with the bevel gear and pinion gear meshed and the first port disposed distal to the pinion gear.

DETAILED DESCRIPTION

Figure 2:
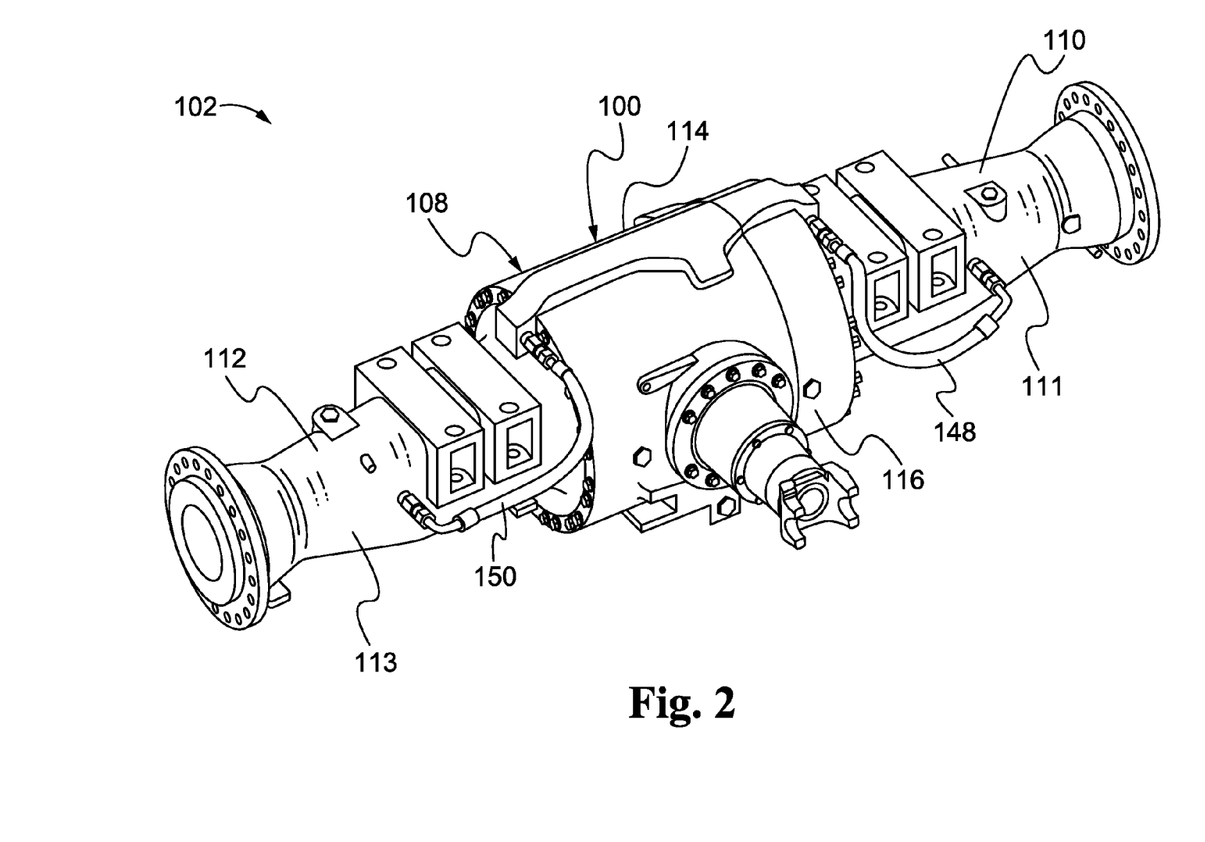
FIG. 2 is a perspective view of an exemplary axle assembly that may include the exemplary center housing portion of FIG. 1.
Figure 3:
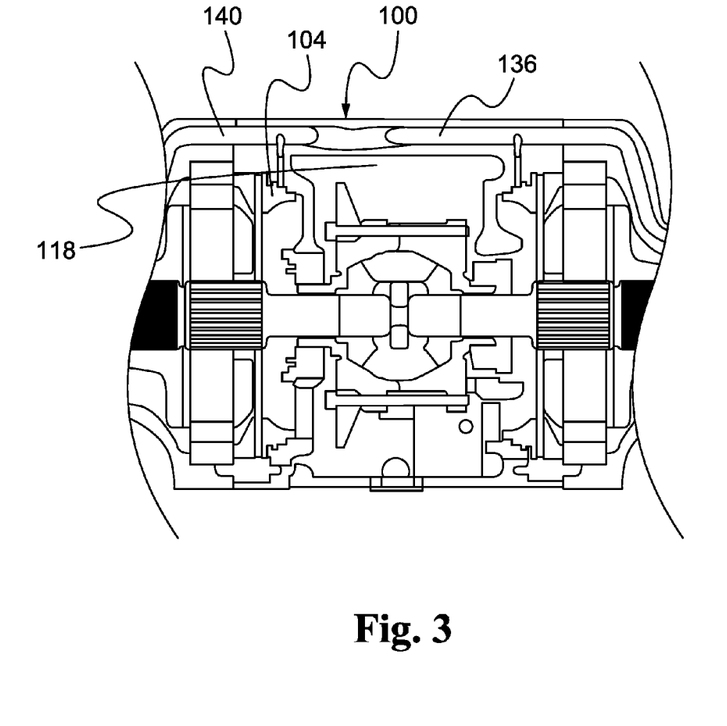
FIG. 3 is a cross-sectional view of one embodiment of the center housing portion.
Figure 4:
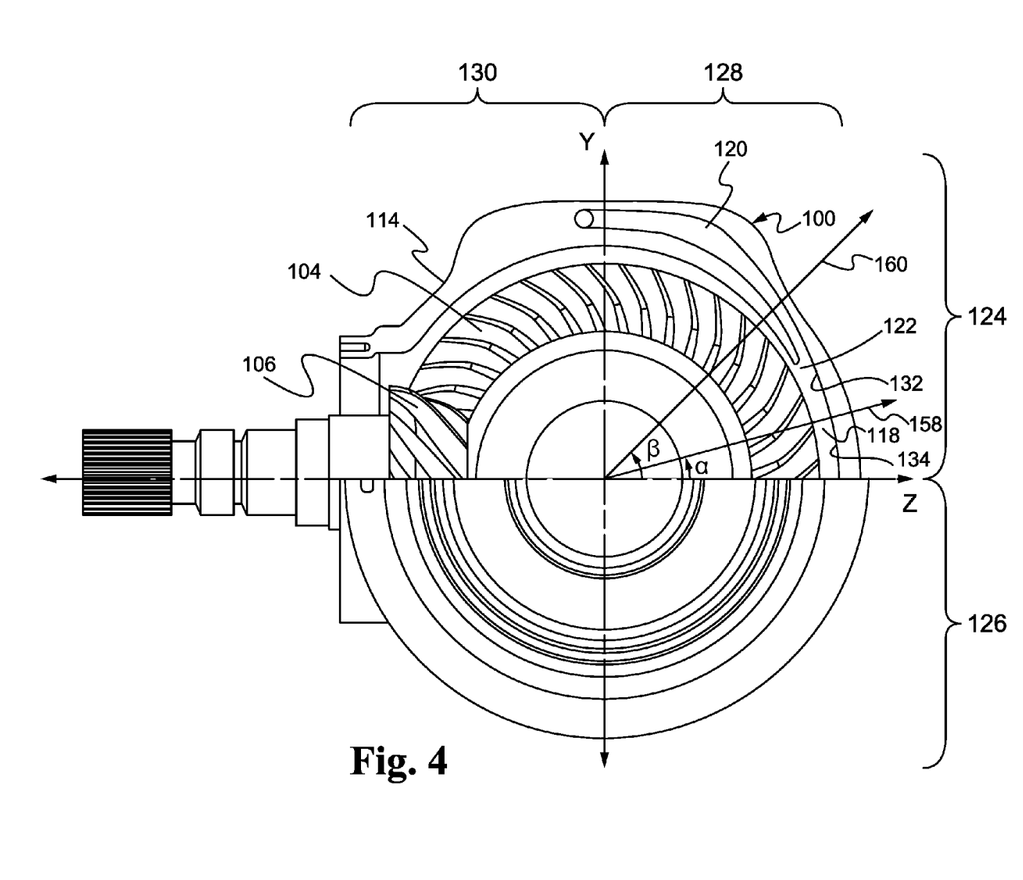
FIG. 4 is a cut-away cross-sectional view of the center housing portion of FIG. 1.

Referring now to the drawings, and with specific reference to FIG. 1, there is shown a cut-away view of one embodiment of a center housing portion constructed in accordance with the present disclosure and generally referred to by reference numeral 100. FIG. 2 illustrates a perspective view of an exemplary axle assembly 102 that may include the exemplary center housing portion 100 of FIG. 1. FIG. 3 illustrates a cross-sectional view of the embodiment of the center housing portion 100. FIG. 4 illustrates a cut-away cross-sectional view of the embodiment of the center housing portion of FIG. 1. In FIG. 4, a bevel gear 104 and pinion gear 106 are shown disposed in the center housing portion 100. While the following detailed description and drawings are made with reference to an axle assembly 102 of a wheel loader, the teachings of this disclosure may be employed on other earth moving, construction, material handling or mining vehicles in which gear assemblies are disposed inside axle housings partially filled with oil or other lubricating fluid.

Figure 5:
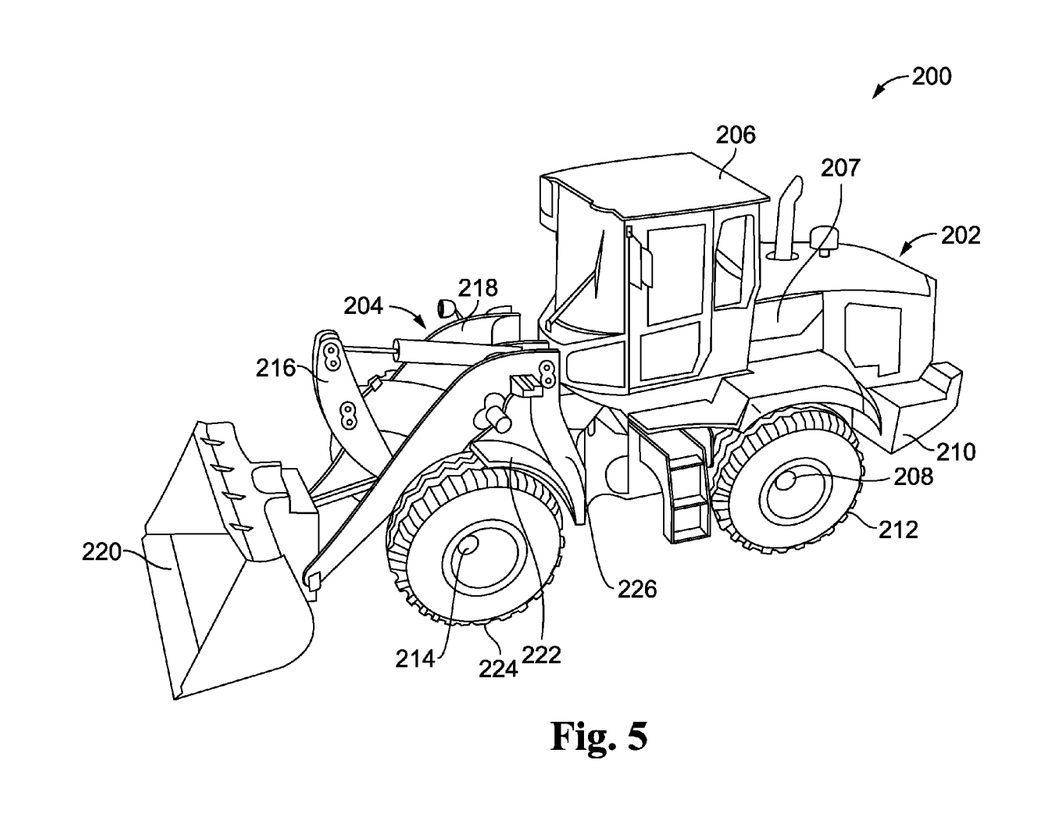
FIG. 5 is a perspective view of a vehicle that incorporates the features of the present disclosure.

FIG. 5 illustrates one example of a vehicle 200 that incorporates the features of the present disclosure. The vehicle 200 includes a rear portion 202 and a front portion 204. The rear portion 202 may include a cab assembly 206, an engine 207, a rear axle assembly 208 including a bevel gear and pinion gear (not shown), and drive train components (not shown) mounted to a rear frame 210. Rear wheels 212 may be mounted to the rear axle assembly 208. The front portion 204 may include a frame assembly 226 and a front axle assembly 214 including a bevel gear and pinion gear (not shown). A boom assembly 216 and a lift arm assembly 218 may be mounted on the frame assembly 226. An implement 220 may be attached to the boom assembly 216 and to the lift arm assembly 218. The front wheels 224 may be mounted on the front axle assembly 214 which may be mounted on the frame assembly 226. A fender 222 may also be mounted on the frame assembly 226.

Turning now to FIGS. 1-4, the axle assembly 102 may comprise a bevel gear 104, a pinion gear 106, and an axle housing 108. The bevel gear 104 has a plurality of teeth and, as may be seen in FIG. 1, the bevel gear 104 is centered on and rotates around a bevel gear axis X. The pinion gear 106 also has a plurality of teeth. At least one of the pinion gear 106 teeth is meshed with at least one of the bevel gear 104 teeth. Generally, an output shaft (not shown) from the vehicle transmission (not shown) provides power to rotate the pinion gear 106. The rotating and meshing of the pinion gear 106 teeth with the bevel gear 104 teeth drives the bevel gear 104 and transfers power, through the rotating bevel gear 104, to the wheels of the vehicle 200 (FIG. 5).

The axle housing 108 (FIG. 2) may comprise the center housing portion 100, a right leg housing portion 110 and a left leg housing portion 112. The center housing portion 100 may be disposed between the right 110 and left leg 112 housing portions.

In some, but not all, embodiments the center housing portion 100 may include a center housing 114 and an intermediate housing 116. The center housing portion 100 may define a center cavity 118 (FIGS. 1 and 3-4) in which the bevel gear 104 is disposed. The center housing portion 100 has an upper half 124 and a lower half 126. The upper half 124 of the center housing portion 100 may be thought of as comprising two quadrants, a first quadrant 128 (shown in the embodiment of FIG. 1 as distal to the pinion gear 106) and a second quadrant 130 (shown in the embodiment of FIG. 1 as proximal to the pinion gear 106). Each of the first and second quadrants 128, 130 is on either side of a vertical axis Y intersecting the bevel gear axis X, and above a horizontal axis Z intersecting the bevel gear axis X.

The center housing portion 100 may include a first channel 120. In an embodiment, the first channel 120 may be integral to the center housing portion 100 of the axle housing 108. In other words, the first channel 120 may be formed as part of the casting or castings, or the like, making up the center housing portion 100 or may be machined into the wall of the center housing portion 100. More specifically, the first channel 120 may be formed as part of the casting or castings, or the like, making up the center housing 114 or may be machined into the wall of the center housing 114. In other embodiments, the first channel 120 may be substantially external to the center housing 114.

At one end, the first channel 120 may have a first entrance port 122 into the center cavity 118. The first entrance port 122 is disposed in the upper half 124 of the center housing portion 100 and may be proximal to the bevel gear 104.

As illustrated in FIGS. 1 and 4, the first entrance port 122 may, in some embodiments, be distal to the pinion gear 106. The first entrance port 122 may be disposed in a first section 132 of an inner wall 134 of the center housing portion 100 in the first quadrant 128. In one embodiment, the first section 132 may extend between a first radius 158 disposed at an angle α and a second radius 160 disposed at an angle β, wherein α is about 15° from the horizontal axis Z and β is about 45° from the horizontal axis Z. In another embodiment, α may be about 25° from the horizontal axis Z and β may be about 35° from the horizontal axis Z, thus the first section 132 may extend between about 25° from the horizontal axis Z to about 35° from the horizontal axis Z. In yet another alternative embodiment, in which the center housing portion 100 is generally centered around the bevel gear axis X, at least a portion of the first entrance port 122 may be disposed on the center housing portion 100 at about the two o'clock position, or about 30° from the horizontal axis Z that is perpendicular to the bevel gear axis X, plus or minus a 10% deviation.

To assist with the flow rate of oil out of the center housing portion 100 and into the right and left leg housing portions 110, 112, the first channel 120 may, in some embodiments, be generally tube-like, meaning without pockets, shelves or other areas that might pool oil. In one embodiment, the first channel 120 may extend in a generally upward direction in the first quadrant 128. In some embodiments, the first channel 120 may generally follow the contour of the center housing 114 and may extend upward in a generally counter-clockwise path in the first quadrant 128 either to or toward the noon position (90° from the horizontal axis Z that is perpendicular to the bevel gear axis X). In yet another embodiment, the first channel 120 may continue into the second quadrant 130 and may generally follow the contour of the center housing 114 or the bevel gear 104 in a generally downward direction in the second quadrant 130. The path of the first channel 120 may be generally arc-like, but does not have to be arc-like.

Figure 6:
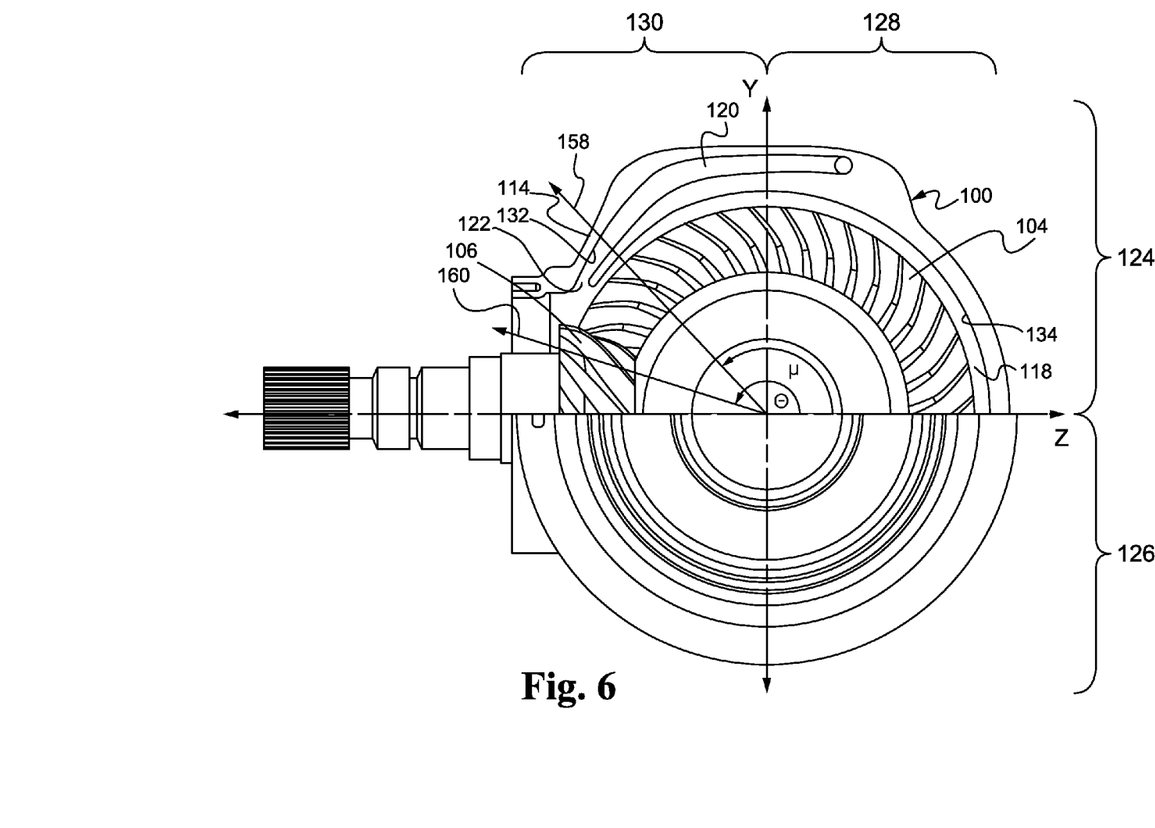
FIG. 6 is a cut-away cross-sectional view of an alternative embodiment of the center housing portion.

In other embodiments of the center housing portion 100, such as that illustrated in FIG. 6, the first entrance port 122 may be proximal to the pinion gear 106 instead of distal to the pinion gear 106. (In FIG. 6, a bevel gear 104 and pinion gear 106 are shown disposed in the center housing portion 100.) In one such embodiment as that illustrated in FIG. 6, the first section 132 may extend, in the second quadrant 130, between the first radius 158 disposed at an angle θ and the second radius 160 disposed at an angle μ, wherein angle θ is about 135° from the horizontal axis Z and angle μ, is about 165° from the horizontal axis Z. In another embodiment, θ may be about 145° from the horizontal axis Z and μ may be about 155° from the horizontal axis Z, thus the first section 132 may extend between about 145° from the horizontal axis Z to about 155° from the horizontal axis Z. In yet another alternative embodiment, in which the center housing portion 100 is generally centered on the bevel gear axis X, at least a portion of the first entrance port 122 may be disposed in the second quadrant 130 at about the ten o'clock position, or about 150° from the horizontal axis Z that is perpendicular to the bevel gear axis X, plus or minus a deviation of 10%.

In an embodiment in which the first entrance port 122 is disposed in the second quadrant 130, the first channel 120 may extend in a generally upward direction in the second quadrant 130 (instead of the first quadrant 128). In some embodiments, the first channel 120 may generally follow the contour of the center housing 114 and may extend upward in a generally clockwise path in the second quadrant 130 either to or toward the noon position (90° from the horizontal axis Z that is perpendicular to the bevel gear axis X). In yet another embodiment, the first channel 120 may continue into the first quadrant 128 and may generally follow the contour of the center housing 114 or bevel gear 104 in a generally downward direction in the first quadrant 128. The path of the first channel 120 in such embodiments, may be generally arc-like, but does not have to be arc-like.

The first entrance port 122 is disposed at one end of the first channel 120. A first conduit 136 intersects the first channel 120 at or near the other end. A second conduit 140 also intersects the first channel 120 at the end of the first channel 120 that is distal to the first entrance port 122. The first conduit 136 may extend in a first direction and the second conduit 140 may extend in a second direction. In some embodiments, the first conduit 136 may be configured to branch off of the first channel 120 in a first direction and the second conduit 140 may be configured to branch off of the first channel 120 in a second direction. In one embodiment, the first direction may be toward the right leg housing portion 110 and the second direction may be toward the left leg housing portion 112. In some embodiments, as illustrated in FIGS. 1-4 and 6, the first and second conduits 136, 140 may be integral to the center housing portion 100. More specifically, the first and second conduits 136, 140 may be formed as part of the casting or castings, or the like, making up the center housing 114 (and intermediate housing 116, if applicable) or may be machined into the wall of the center housing 114 (and intermediate housing 116, if applicable). In other embodiments, the first and second conduits 136, 140 may be entirely or partially disposed outside of the center housing 114 (and/or intermediate housing 116). For example, the first and second conduits 136, 140 may be hoses, or the like, attached or connected to the first channel 120. Similar to the first channel 120, the first and second conduits 136, 140 may be generally tube-like without pockets or shelves to pool oil.

Figure 8:
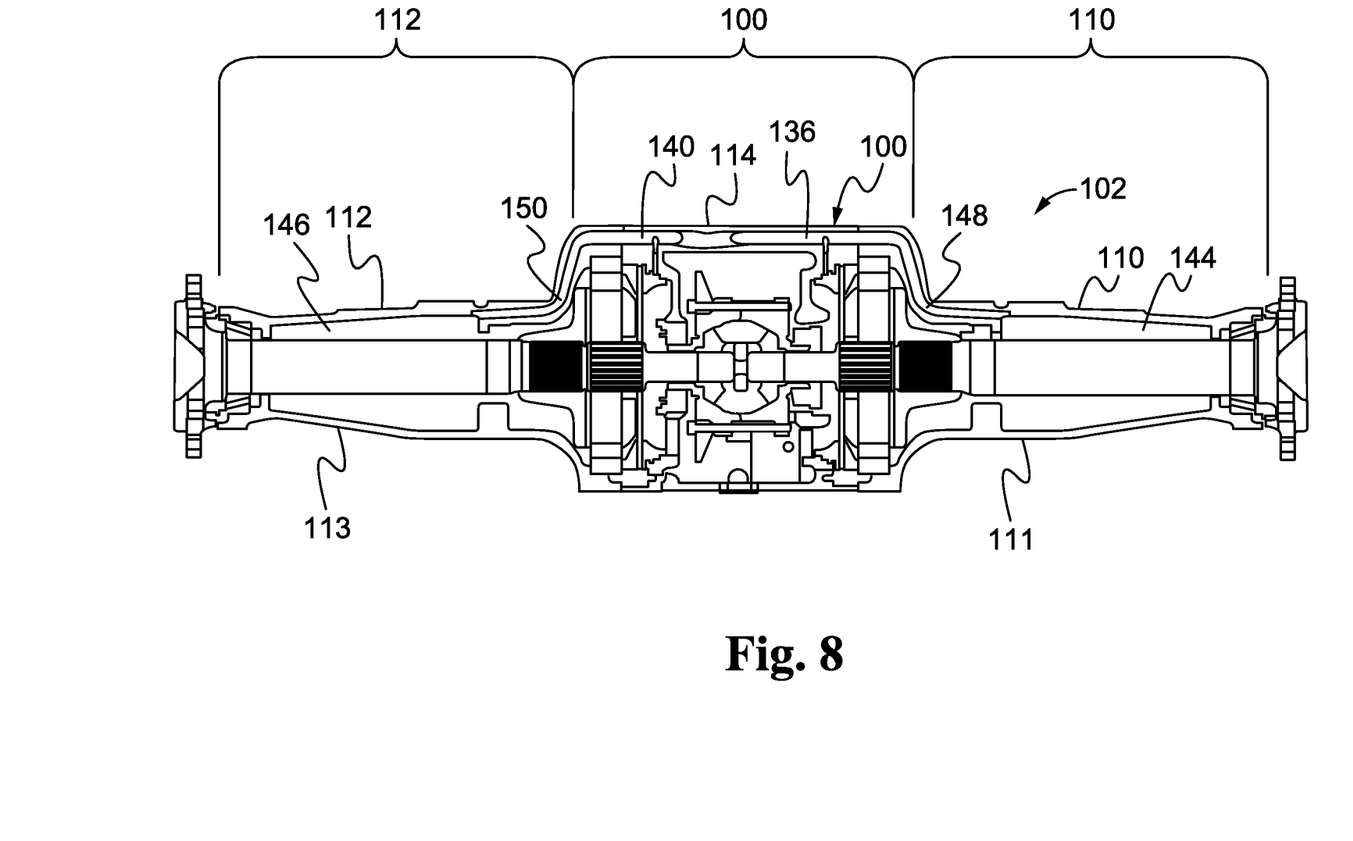
FIG. 8 is a cross-sectional view of the exemplary axle assembly of FIG. 7.

The right leg housing portion 110 may include a right leg housing 111 defining a right leg cavity 144 (best seen in FIG. 8) and the left leg housing portion 112 may include a left leg housing 113 defining a left leg cavity 146 (best seen in FIG. 8). A first passageway 148, extends between the first conduit 136 and the right leg cavity 144. Similarly a second passageway 150 extends between the second conduit 140 and the left leg cavity 146. The first and second passageways 148, 150 may also be generally tube-like without pockets or shelves for pooling oil.

In one embodiment, the first and second passageways 148, 150 may be external to the respective right and left leg housings 111, 113. For example, FIG. 2 illustrates an embodiment in which the first and second conduits 136, 140 are integral to the center housing 114 but the first and second passageways 148, 150 are external hoses. In the embodiment illustrated in FIG. 2, the first passageway 148 is connected to the integral first conduit 136 by a hose connection or other suitable connection. Similarly, the second passageway 150 is connected to the integral second conduit 140 by a hose connection or other suitable connection assembly as is known in the art.

Figure 7:
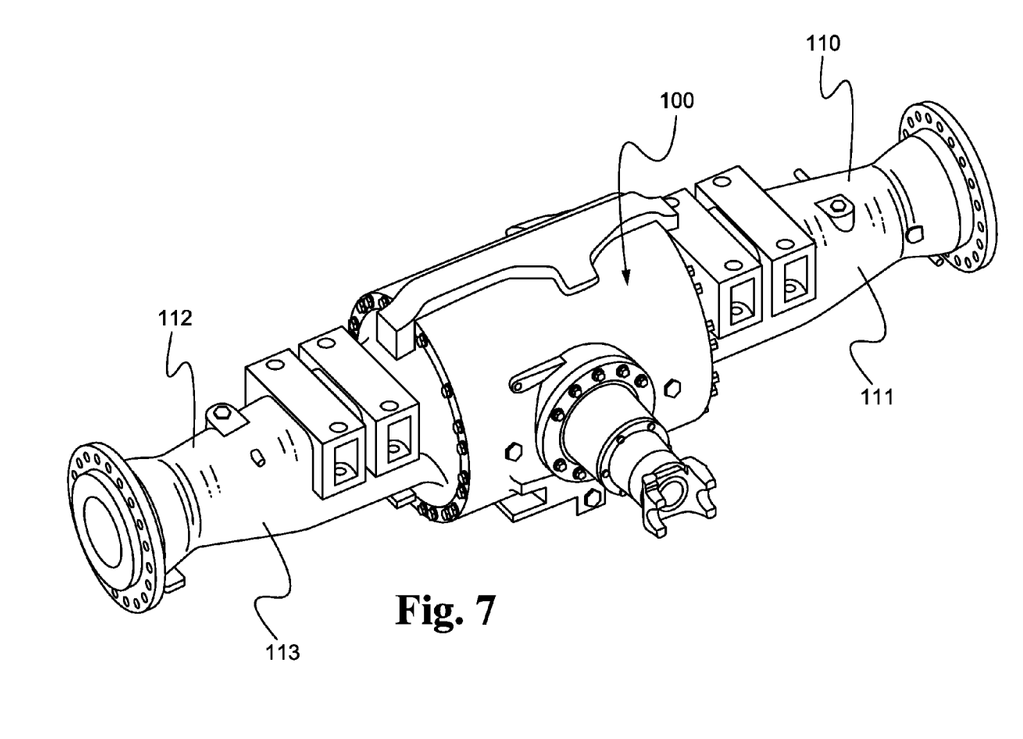
FIG. 7 is a perspective view of another exemplary axle assembly constructed in accordance with the teachings of this disclosure.

In another embodiment, the first and second passageways 148, 150 may be integral or partially integral with the respective right and left leg housing portions 110, 112 (more specifically, the right and left leg housings 111, 113). FIGS. 7-8 illustrate an embodiment in which the first and second conduits 136, 140 are integral to the center housing 114, and the first passageway 148 is integral to the right leg housing 111 and the second passageway 150 is integral to the left leg housing 113.

Figure 9:
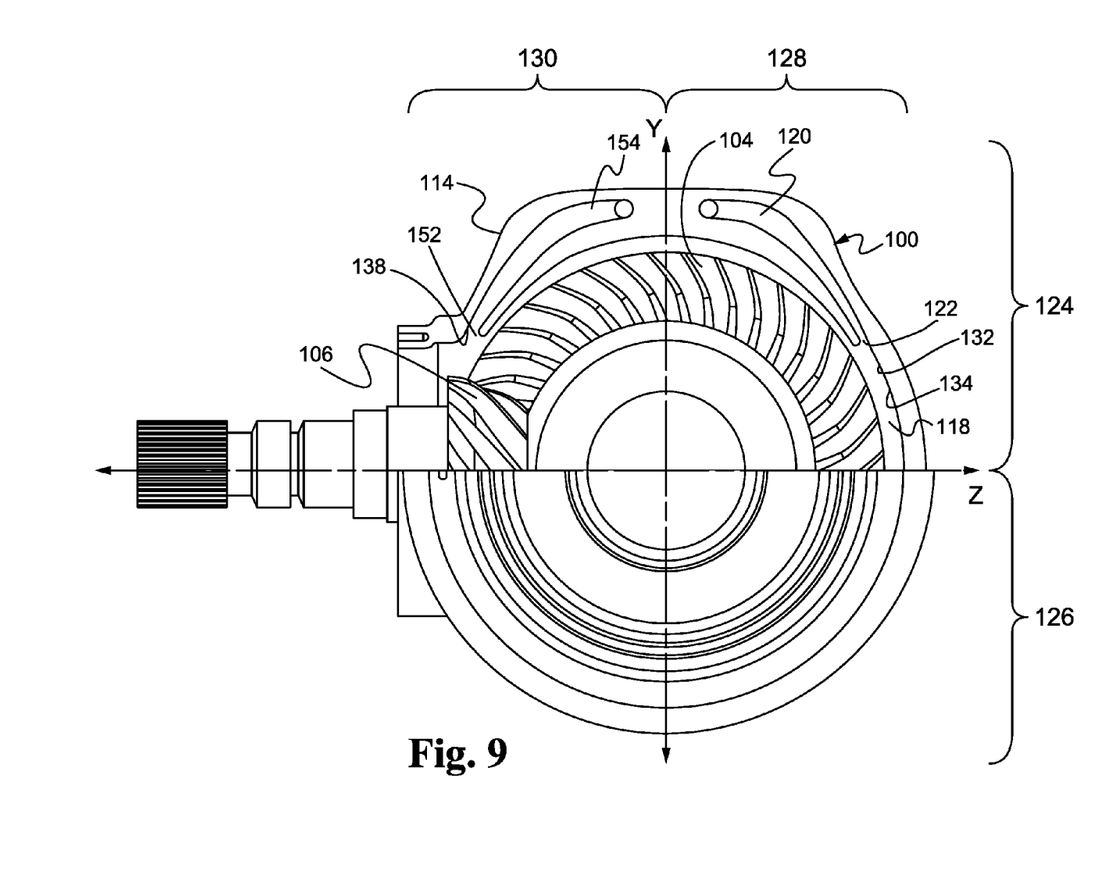
FIG. 9 is a cut-away cross-sectional view of another alternative embodiment of a center housing portion constructed in accordance with the teachings of this disclosure.

In some alternative embodiments, there may be more than one entrance port disposed in the upper half 124 of the center housing portion 100. For example, the center housing portion 100 may include a first channel 120 and first entrance port 122 and a second channel 154 and second entrance port 152. As illustrated in FIG. 9, there may be a first entrance port 122 disposed in the first quadrant 128 (as discussed previously) of the center housing portion 100 and a similar second entrance port 152 disposed in the second quadrant 130 of the center housing portion 100. (In FIG. 9, a bevel gear 104 and pinion gear 106 are shown disposed in the center housing portion 100.)

The second entrance port 152 may be disposed in a second section 138 of an inner wall 134 of the center housing portion 100 in the second quadrant 130. In one such embodiment, the second section 138 may extend, in the second quadrant 130, between the first radius 158 disposed at an angle θ and the second radius 160 disposed at an angle μ, wherein angle θ is about 135° from the horizontal axis Z and angle μ, is about 165° from the horizontal axis Z. In another embodiment, θ may be about 145° from the horizontal axis Z and μ may be about 155° from the horizontal axis Z, thus the first section 132 may extend between about 145° from the horizontal axis Z to about 155° from the horizontal axis Z. In yet another alternative embodiment, in which the center housing portion 100 is generally centered on the bevel gear axis X, at least a portion of the second entrance port 152 may be disposed in the second quadrant 130 at about the ten o'clock position, or about 150° from the horizontal axis Z that is perpendicular to the bevel gear axis X, plus or minus a deviation of 10%.

The center housing portion 100 may include a first channel 120 and a first entrance port 122 and a second channel 154 and a second entrance port 152. FIG. 9 may be seen as a composite of FIGS. 4 and 6. As illustrated in FIG. 9, the first entrance port 122 may be distal to the pinion gear 106 and the second entrance port 152 may be proximal to the pinion gear 106.

In such an embodiment as that illustrated in FIG. 9, the first channel 120 may extend between the first entrance port 120 and the first and second conduits 136, 140 and the second channel 154 may extend between the second entrance port 152 and the first and second conduits 136, 140. In such an embodiment, the first conduit 136 may branch off of the first channel 120 and off of the second channel 154, and the second conduit 140 may also branch off of the first channel 120 and off of the second channel 154. Each of the first and second conduits 136, 140 may generally form a Y-shape.

Figure 10:
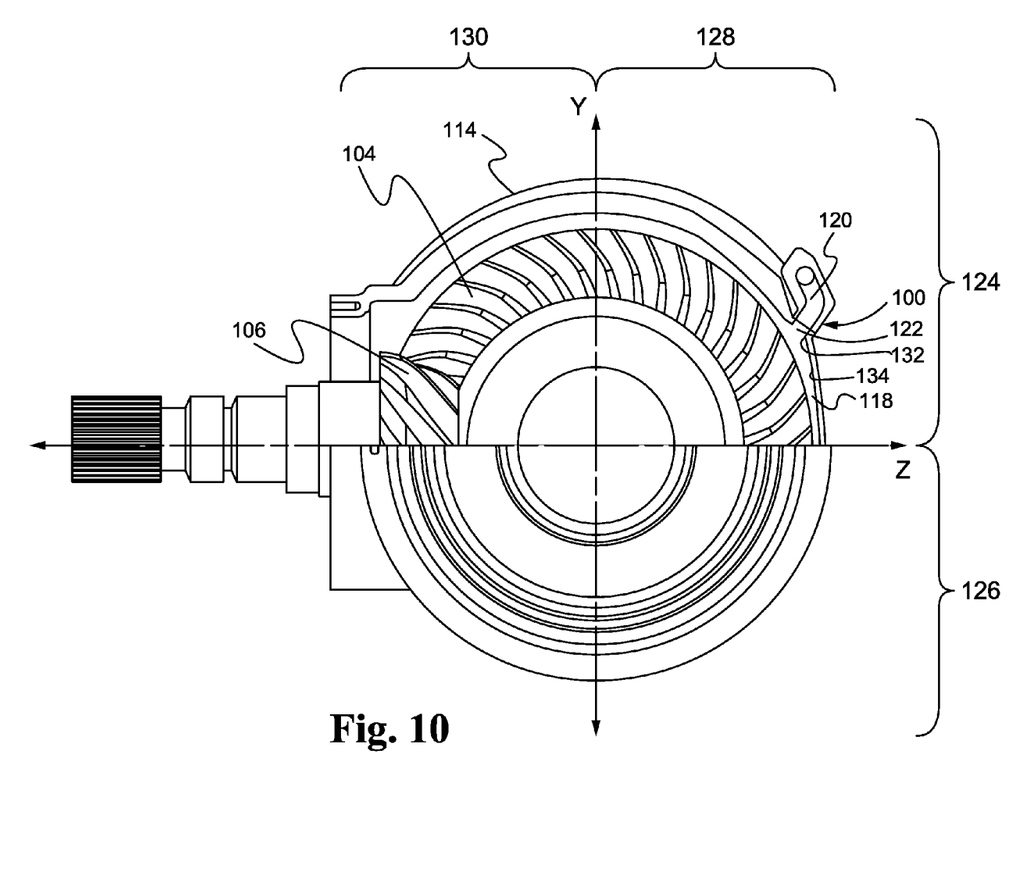
FIG. 10 is a cut-away cross-sectional view of another embodiment of the center housing portion constructed in accordance with the teachings of this disclosure.
Figure 11:
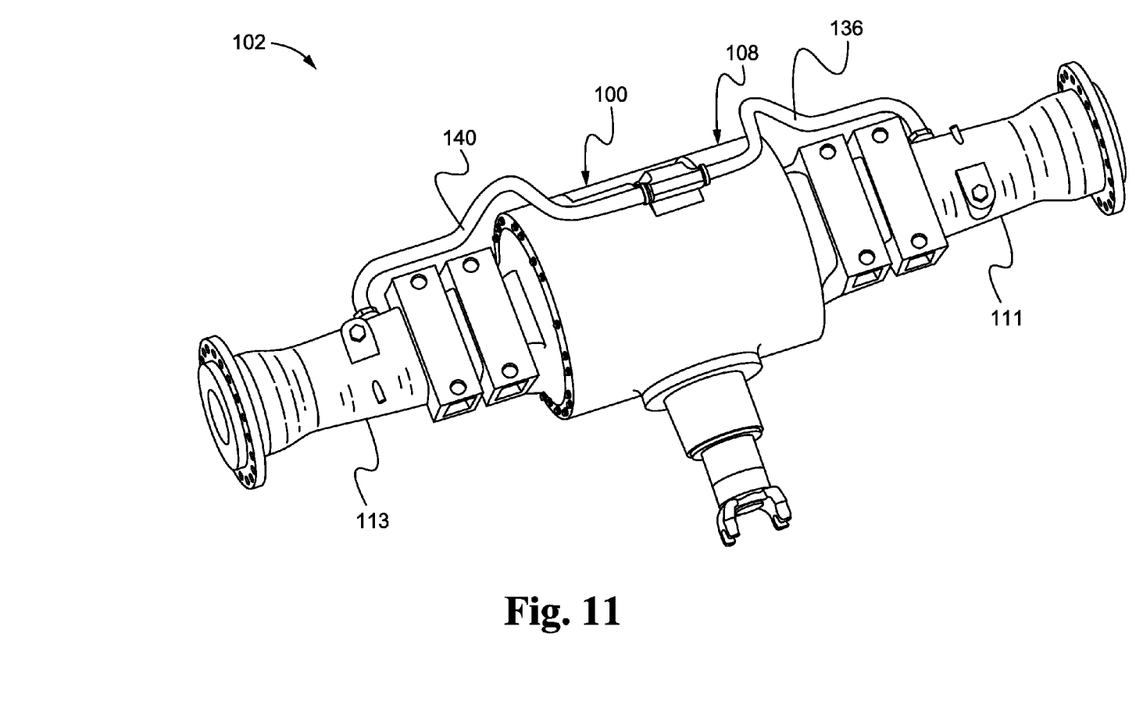
FIG. 11 is a perspective view of an exemplary axle assembly that may include the exemplary center housing portion of FIG. 10.

FIGS. 10-11 illustrate yet another embodiment according to the teachings of this disclosure. (In FIG. 10, a bevel gear 104 and pinion gear 106 are shown disposed in the center housing portion 100.) In this embodiment, the center housing portion 100 may include a first channel 120 having a first entrance port 122 from the center cavity 118. Unlike the previously discussed embodiments, the first conduit 136 may be substantially external to the axle housing 108 and may extend between the first channel 120 and the right leg cavity 144. Similarly, the second conduit 140 may be substantially external to the axle housing 108 and may extend between the first channel 120 and the left leg cavity 146. In the embodiment illustrated in FIGS. 10-11, the first channel 120 is substantially external to the center housing 114. In other embodiments, the center housing portion 100 (more specifically, the center housing 114) may include a substantially integral first channel 120.

Figure 12:
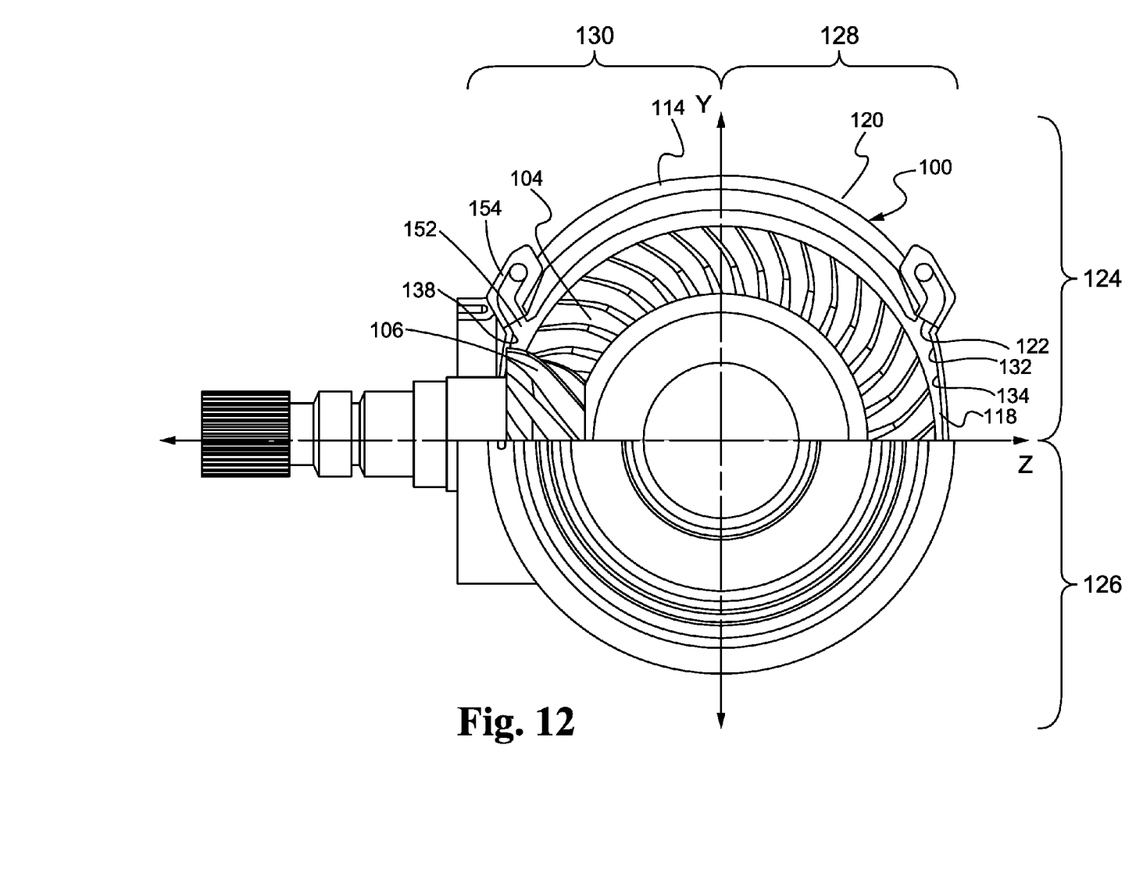
FIG. 12 is a cut-away cross-sectional view of another embodiment of the center housing portion constructed in accordance with the teachings of this disclosure.
Figure 13:
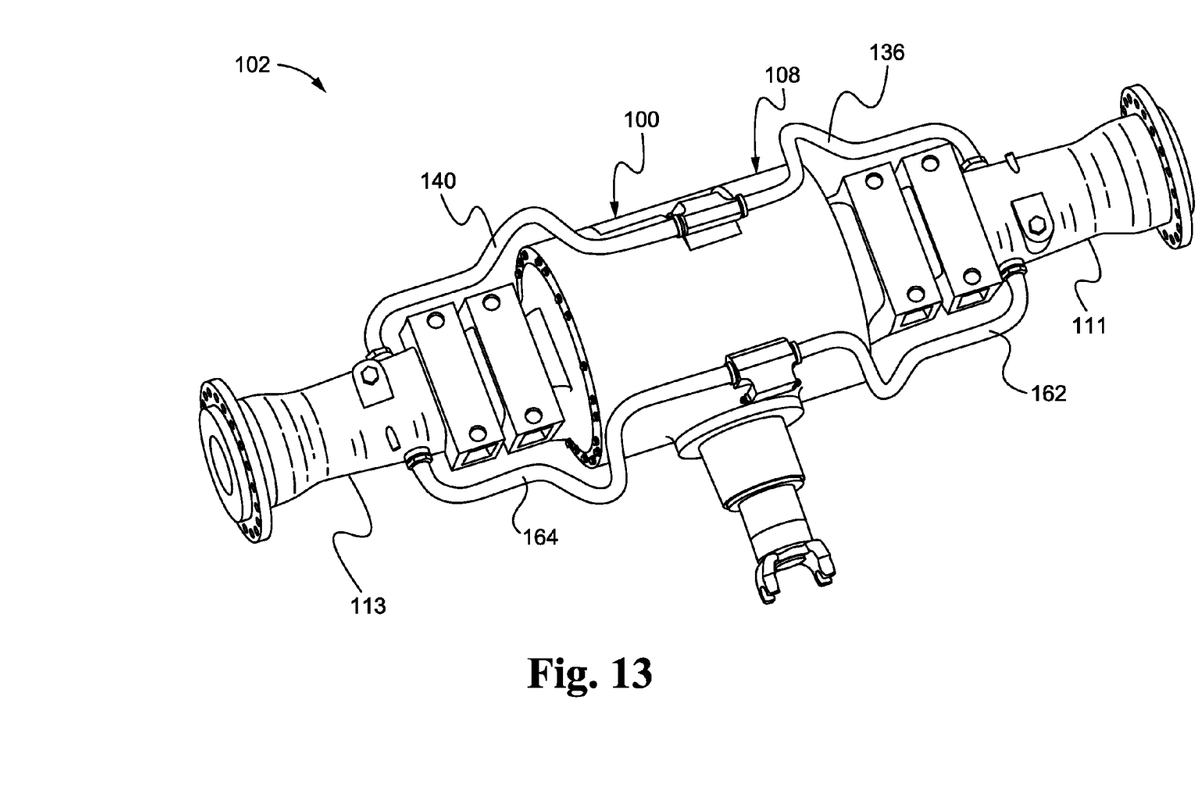
FIG. 13 is a perspective view of an exemplary axle assembly that may include the exemplary center housing portion of FIG. 12.

FIGS. 12-13 illustrate yet another embodiment. In this embodiment, the center housing portion 100 may include a first channel 120 having a first entrance port 122 into the center cavity 118, and a second channel 154 having a second entrance port 152 into the center cavity 118. The first entrance port 122 may be disposed in the first quadrant 128 of the center housing portion 100 and the second entrance port 152 may be disposed in the second quadrant 130 of the center housing portion 100. The first conduit 136 may be substantially external to the axle housing 108 and may extend between the first channel 120 and the right leg cavity 144, and the second conduit 140 may be substantially external to the axle housing 108 and may extend between the first channel 120 and the left leg cavity 146. In addition, a third conduit 162 may be substantially external to the axle housing 108 and may extend between the second channel 154 and the right leg cavity 144, and a fourth conduit 164 may be substantially external to the axle housing 108 and may extend between the second channel 154 and the left leg cavity 146. In other embodiments, the first, second, third and fourth conduits 136, 140, 162, 164 may be generally integral to the axle housing 108. In the embodiment illustrated in FIGS. 12-13, the first and second channels 120, 154 are substantially external to the center housing 114. In other embodiments, the center housing portion 100 (more specifically, the center housing 114) may include substantially integral first and second channels 120, 154.

The perimeter of the entrance port(s) 122, 152 may be oval, circular, pill-shaped (generally rectangular with rounded ends) or any other appropriate geometry. Likewise, in some embodiments a portion of the channel(s) may have a generally circular, oval or pill-shaped, or other appropriately shaped cross-section. Near the entrance port(s) 122, 152, the channel(s) 120, 154 may, in some embodiments, be configured to be generally tangential to the geometry of the inner wall 134 (of the center housing portion 100) that precedes the entrance port(s) 122, 152.

A method of assembling a churning reduction assembly for a vehicle is disclosed. The method may comprise providing a bevel gear 104, a pinion gear 106 and a axle housing 108. The bevel gear 104 may be rotatable about a bevel gear axis X. The axle housing may comprise a right leg housing portion 110 including a right leg housing 111 defining a right leg cavity 144, a left leg housing portion 112 including a left leg housing 113 defining a left leg cavity 146, a center housing portion 100, the first conduit 136 and the second conduit 140. The center housing portion 100 may be disposed between the right and left leg housing portions 110, 112 and may define the center cavity 118 in which the bevel gear 104 is disposed. The center housing portion 100 may include a first channel 120 and a first entrance port 122 disposed in the upper half 124 of the center housing portion 100. The first conduit 136 may extend between the first channel 120 and the right leg cavity 144. The second conduit 140 may extend between the first channel 120 and the left leg cavity 146. The method may further comprise positioning the bevel gear 104 and the pinion gear 106 inside the center housing portion 100 with the bevel gear 104 and pinion gear 106 meshed and the first entrance port 122 disposed distal to the pinion gear 106.

INDUSTRIAL APPLICABILITY

The axle housing contains an amount of oil that provides lubrication for the various moving parts within the axle housing, including the bevel and pinion gears. The present disclosure may find applicability in reducing the amount of oil in the proximity of the rotating bevel and pinion gears, cooling the oil within the axle housing and providing a source of oil to lubricate components disposed in the cavities of the leg housing portions while the vehicle is operating, especially when operating on an incline.

The oil resists the rotation of the bevel gear and pinion gear, creating churning losses. The entrance ports in the center housing portion allow oil pumped by the action of the rotating bevel and pinion gears to escape from the center cavity area where the bevel gear is disposed, thus reducing the amount of oil in the immediate proximity to the bevel gear. In addition, by smoothly flowing the oil from the entrance port(s) to the cavities of the leg housing portions, the oil is not only cooled but is a source of lubrication for the moving components within the leg housing cavities. The flow of the oil into the leg housing is beneficial because when operating on an incline, the oil in the axle housing flows downward in the direction of gravity to the axle housing leg that is lowest on the incline. The axle assembly disclosed herein provides a source of oil into the leg housing that is disposed at a higher point on the incline and, hence, a replacement source of lubrication for the components in the leg housing higher on the incline.

The channels and conduits direct the flow of oil away from the entrance ports and into the cavities of the right and left leg housings thus, removing oil from the immediate vicinity of the bevel gear and into the leg housings. The axle assembly disclosed herein provides about a 30-50% reduction in churning loss, about a 5-10° Celsius reduction in oil temperature in the axle housing, and a flow rate in the range of about 4 to about 7 gallons per minute out of the center housing portion and into the leg cavities. The channels and conduits do not have pockets or shelves for pooling oil, or the like in order to achieve a smooth flow of oil and the desired flow rate.

The features disclosed herein may be particularly beneficial to wheel loaders and other earth moving, construction, mining or material handling vehicles that utilize gear sets within oil filled axle housings.

What is claimed is:

1. An axle assembly comprising:
 a bevel gear rotatable about a bevel gear axis;
 a pinion gear meshed with the bevel gear; and
 a center housing defining a center cavity in which the bevel gear is disposed, the center housing including an integral first channel, an integral tube-like first conduit and an integral tube-like second conduit, the first channel having a first entrance port into the center cavity disposed proximal to the bevel gear, the first channel extending from the entrance port in an upward direction around a portion of the bevel gear, the first conduit configured to branch off of the first channel in a first direction, and the second conduit configured to branch off of the first channel in a second direction, at least a portion of the first conduit disposed above the entire bevel gear.

2. The axle assembly of claim 1, in which the center housing includes a first section extending between about 15° to about 45° from a horizontal axis intersecting the bevel gear axis, wherein the first entrance port is disposed in the section.

3. The axle assembly of claim 2, wherein the first entrance port is distal from the pinion gear.

4. The axle assembly of claim 1, in which the center housing includes a section extending between about 135° to about 165° from a horizontal axis intersecting the bevel gear axis, wherein the port is disposed in the section.

5. The axle assembly of claim 4, wherein the port is proximal to the pinion gear.

6. The axle assembly of claim 1, further including:
 a right leg housing portion including a right leg housing defining a right leg cavity, and a first passageway extending from the first conduit into the right leg cavity; and
 a left leg housing portion including a left leg housing defining a left leg cavity, and a second passageway extending from the second conduit into the left leg cavity.

7. The axle assembly of claim 6, wherein the first and second passageways are substantially external to the right and left leg housings.

8. The axle assembly of claim 6, wherein the first passageway is substantially integral to the right leg housing and the second passageway is substantially integral to the left leg housing.

9. The axle assembly of claim 1, in which the center housing further includes an integral second channel, the second channel having a second entrance port into the center cavity disposed proximal to the bevel gear, the first conduit configured to branch off of the second channel in the first direction, and the second conduit configured to branch off of the second channel in the second direction.

10. The axle assembly of claim 9, in which the center housing includes a first section extending between about 15° to about 45° from the horizontal axis intersecting the bevel gear axis, wherein the first entrance port is disposed in the first section and is distal from the pinion gear.

11. The axle assembly of claim 10, in which the center housing includes a second section extending between about 135° to about 165° from the horizontal axis intersecting the bevel gear axis, wherein the second entrance port is disposed in the second section and is proximal to the pinion gear.

12. A method of assembling a churning reduction assembly for a vehicle, the method comprising:
 providing a bevel gear and a pinion gear, the bevel gear rotatable about a bevel gear axis;
 providing an axle housing including a right leg housing defining a right leg cavity, a left leg housing defining a left leg cavity, a center housing portion, a first tube-like conduit and a second tube-like conduit, the center housing portion disposed between the right and left leg housings and including a center housing defining a center cavity in which the bevel gear is disposed, a first channel, and a first entrance port disposed in an upper half of the center housing, the first channel extending from the entrance port in an upward direction around a portion of the bevel gear, the first conduit extending between the first channel and the right leg cavity, at least a portion of the first conduit disposed above the entire bevel gear, the second conduit extending between the first channel and the left leg cavity; and
 positioning the bevel gear and the pinion gear inside the center housing with the bevel gear and pinion gear meshed and the first entrance port disposed distal to the pinion gear.

13. The method of claim 12, wherein in which the center housing includes a section extending between about 15° to about 45° from a horizontal axis intersecting the bevel gear axis, wherein the first entrance port is disposed in the section.

14. The method of claim 13, wherein the first entrance port is disposed about 30° from a horizontal axis intersecting the bevel gear axis.

* * * * *